(12) United States Patent
Kim (10) Patent No.: US 7,388,639 B2
(45) Date of Patent: Jun. 17, 2008

(54) IN-PLANE SWITCHING MODE LIQUID CRYSTAL DISPLAY DEVICE HAVING MULTI-DOMAINS

(75) Inventor: Woo-Hyun Kim, Seodaemun-Gu (KR)

(73) Assignee: LG Display Co., Ltd., Seoul (KR)

( * ) Notice: Subject to any disclaimer, the term of this patent is extended or adjusted under 35 U.S.C. 154(b) by 111 days.

(21) Appl. No.: 10/879,152

(22) Filed: Jun. 30, 2004

(65) Prior Publication Data

US 2005/0140897 A1  Jun. 30, 2005

(30) Foreign Application Priority Data

Dec. 29, 2003  (KR) .................. 10-2003-0099376

(51) Int. Cl.
*G02F 1/1343* (2006.01)
*G02F 1/1337* (2006.01)

(52) U.S. Cl. .................. 349/141; 349/146; 349/129; 349/38

(58) Field of Classification Search ............... 349/141, 349/146, 129, 38
See application file for complete search history.

(56) References Cited

U.S. PATENT DOCUMENTS

| 5,745,207 | A | * | 4/1998 | Asada et al. ............ 349/141 |
| 6,128,061 | A | | 10/2000 | Lee et al. |
| 6,208,399 | B1 | * | 3/2001 | Ohta et al. ............ 349/139 |
| 6,545,658 | B2 | * | 4/2003 | Ohta et al. ............ 345/98 |
| 6,630,977 | B1 | | 10/2003 | Yamazaki et al. |
| 6,784,964 | B2 | * | 8/2004 | Nakayoshi et al. ...... 349/139 |
| 6,859,248 | B2 | * | 2/2005 | Matsumoto et al. ..... 349/141 |
| 2002/0008830 | A1 | | 1/2002 | Matsumoto et al. |
| 2005/0052602 | A1 | * | 3/2005 | Liu .................... 349/141 |

FOREIGN PATENT DOCUMENTS

| JP | H10-62788 | 3/1998 |
| JP | 10114833 | 6/1998 |
| JP | H11-326955 | 11/1999 |
| JP | 2001-33824 | 2/2001 |
| JP | 2001-305567 | 10/2001 |
| JP | 2002-31802 | 1/2002 |
| WO | WO 98/08136 | 2/1998 |

\* cited by examiner

*Primary Examiner*—Mike Qi
(74) *Attorney, Agent, or Firm*—McKenna Long & Aldridge LLP (57) ABSTRACT

An in-plane switching mode liquid crystal display device having multi domains comprises a plurality of pixels defined by a plurality of gate and data lines on a first substrate each pixel including a first region and a second region, a switching member in each pixel, and at least one pair of electrodes disposed substantially parallel in each respective pixel to form a parallel electric field, the electrodes being bent and symmetric to each other in at least one region of the first and second regions.

29 Claims, 9 Drawing Sheets

IN-PLANE SWITCHING MODE LIQUID CRYSTAL DISPLAY DEVICE HAVING MULTI-DOMAINS

This application claims the benefit of Korean Patent Application No. 2003/99376 filed on Dec. 29, 2003 which is hereby incorporated by reference for all purposes as if fully set forth herein.

BACKGROUND OF THE INVENTION

1. Field of the Invention

The present invention relates to an in-plane switching mode liquid crystal display (LCD) device. More particularly, the present invention relates to an in-plane switching mode liquid crystal display device in which a pixel is divided into at least three domains to improve the viewing angle and compensate a color shift problem of the device.

2. Description of the Related Art

Since the introduction of portable electronic devices such as mobile phones, PDAs, and notebook computers, flat panel display devices such as a Plasma Display Panel (PDP), Field Emission Display (FED), Vacuum Fluorescent Display (VFD), and liquid crystal display (LCD) devices have been actively developed. Among the flat panel display devices, the liquid crystal display device is primarily used because of mass production, high definition and effective driving method.

The liquid crystal display device can be divided into various display modes according to the alignment of liquid crystal molecules. The TN (twisted nematic) mode liquid crystal display device is mainly used because of its effective black mode, fast response time and low driving voltage. In the TN mode liquid crystal display device, the liquid crystal molecules are aligned perpendicular to the substrate when an electric field is applied. Accordingly, there is a problem of a narrow viewing angle when the driving voltage is applied.

In order to overcome this problem, liquid crystal display devices having a wide viewing angle characteristics, such as an in-plane switching (IPS) mode liquid crystal display device, have been introduced. In the IPS mode liquid crystal display device, the electric field applied to the liquid crystal molecules is parallel to the surface of the substrate. Thus, the liquid crystal molecules are aligned parallel to the surface of the substrate which results in an improved viewing angle.

FIG. 1 illustrates an IPS mode liquid crystal display device.

As shown in the related art IPS mode liquid crystal display device in FIG. 1, the alignment direction is formed in a predetermined angle to an elongated direction of the gate line to align liquid crystal molecules 32 of the liquid crystal layer 30. As shown in FIGS. 1A and 1B, when an electric field is not applied (the field-off state), the liquid crystal molecules are aligned along the alignment direction.

Figure 1A:
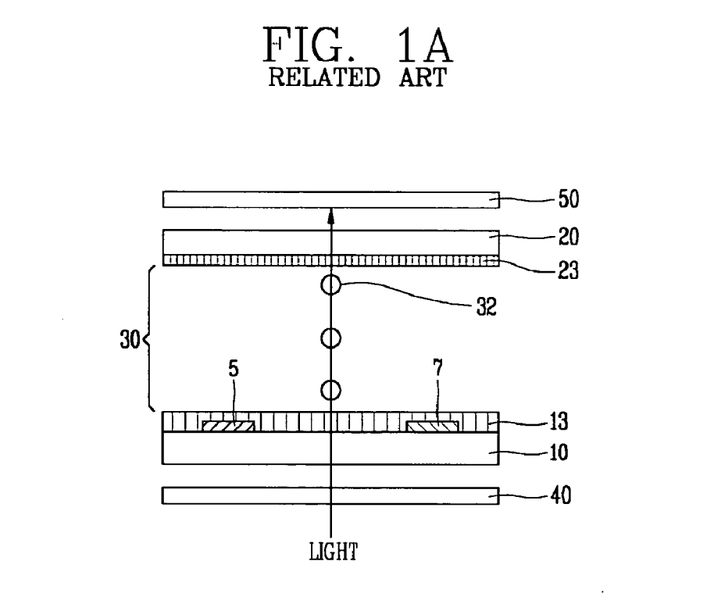
FIGS. 1A-1D illustrate schematic views of a basic driving method of a related art in-plane switching mode liquid crystal display device.
Figure 1B:
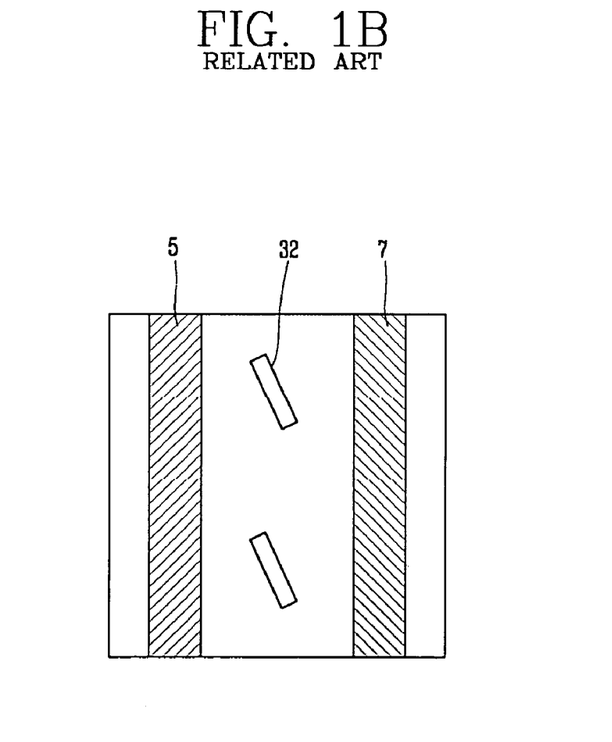
Figure 1C:
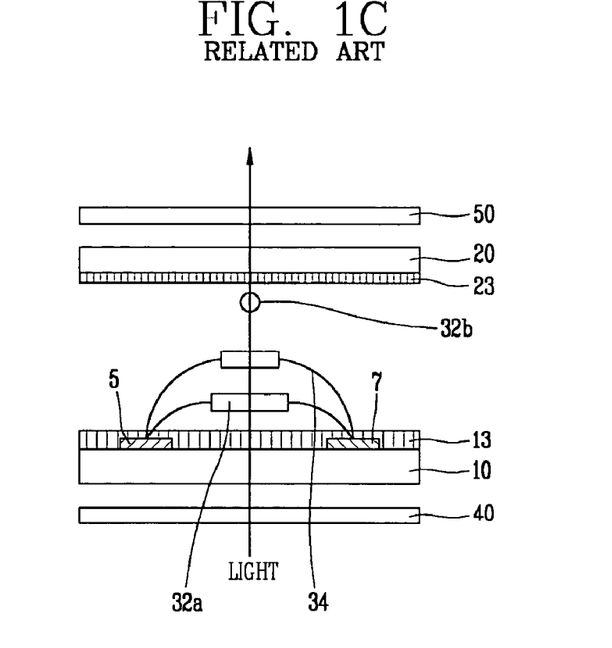
Figure 1D:
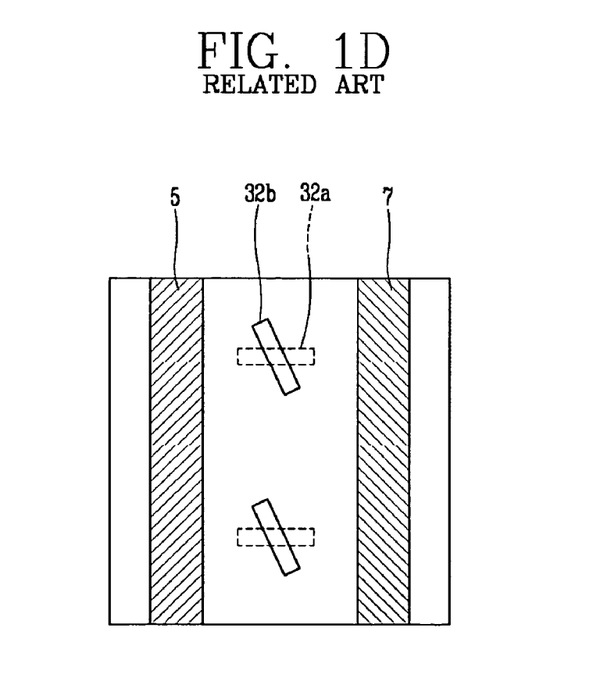
Figure 2:
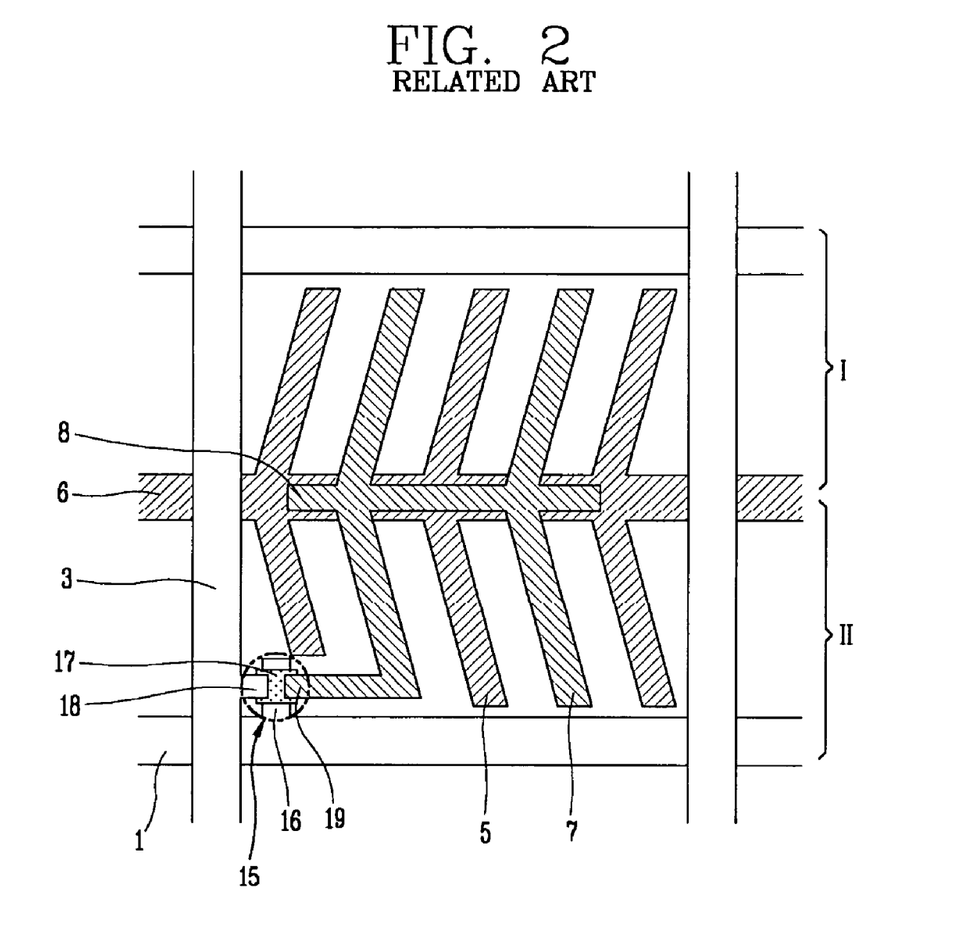
FIG. 2 is a plan view illustrating the structure of the two-domains in the related art IPS mode liquid crystal display device.

In this IPS mode liquid crystal display device, however, there is problem that the color is shifted along the viewing angles. As shown in FIG. 1C, the liquid crystal molecules near the first substrate 10 are aligned parallel to the elongate direction of the gate line by the electric field and the liquid crystal molecules near the second substrate 20 are aligned in the angle of 90° to 180° with respect to the gate line, so that the liquid crystal molecules are twisted from the first substrate 10 to the second substrate 20. Thus, in the viewing angle directions X and Y, the color is shifted to blue and yellow along the viewing direction. As a result, the image quality is deteriorated. In order to overcome this problem, an IPS mode liquid crystal display device has been introduced as shown in FIG. 2 and disclosed in Korea Patent Application No. 1996-23115.

In this IPS mode liquid crystal display device, a pixel, defined by the gate line 1 and data line 3, is divided into two domains. That is, the pixel is divided into two domains I,II by a common line 6 and a pixel electrode line 8 that are respectively connected to the common electrode 5 and the pixel electrode 7.

In the pixel, the thin film transistor 15 including a gate electrode 16, a semiconductor layer 17, a source electrode 18 and a drain electrode 19 is disposed at the crossing of the gate line 1 and the data line 3. The signal from an outer driver is supplied to the pixel electrode 7 through the thin film transistor, and thus an electric field parallel to the surface of the substrate is applied in the liquid crystal layer.

The alignment direction (i.e., a rubbing direction) is formed in the elongated direction of the data line 3. Further, the elongated direction of the common electrode 5 and the pixel electrode 7 in the first domain I is different from that of the common electrode 5 and the pixel electrode 7 in the second domain II. Specifically, the common electrode 5 and the pixel electrode 7 are arranged in a slanted direction with reference to the gate line 1, and the common electrodes 5 and the pixel electrodes 7 disposed respectively in the first domain I and the second domain II are symmetric and centered on the common line 6. Accordingly, the color shifts in the first domain I and the second domain II compensate each other to prevent color shift in the pixel.

In this IPS mode liquid crystal display device having two domains, however, improvement of the viewing angle characteristic may be limited. When comparing the IPS mode liquid crystal display device having two domains with a cathode ray tube, for example, there are problems that the viewing angle characteristic is low and the color is shifted.

SUMMARY OF THE INVENTION

Accordingly, the present invention is directed to an in-plane switching mode liquid crystal display device having multi-domains that substantially obviates one or more of the problems due to limitations and disadvantages of the related art.

An advantage of the present invention is to provide an in-plane switching mode liquid crystal display device having multi-domain to improve viewing angle and prevent color shift.

Additional features and advantages of the invention will be set forth in the description which follows, and in part will be apparent from the description, or may be learned by practice of the invention. These and other advantages of the invention will be realized and attained by the structure particularly pointed out in the written description and claims thereof, as well as the appended drawings.

To achieve these advantages, the IPS mode liquid crystal display device comprises a plurality of pixels defined by a plurality of gate lines and data lines on the first substrate, the pixels including a first region and a second region; a switching member in each pixel; and at least one pair of electrodes disposed substantially parallel in the pixel to form a parallel electric field, the electrodes being bent and symmetric to each other for at least one region of the first and second regions.

In another aspect of the present invention, an in-plane switching mode liquid crystal display device includes a plurality of gate and data lines defining a plurality of pixels, and at least one pair of electrodes disposed substantially parallel in the pixels, wherein the pixels include at least three domains, wherein a parallel electric field is formed having a different direction for each domain.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 3:
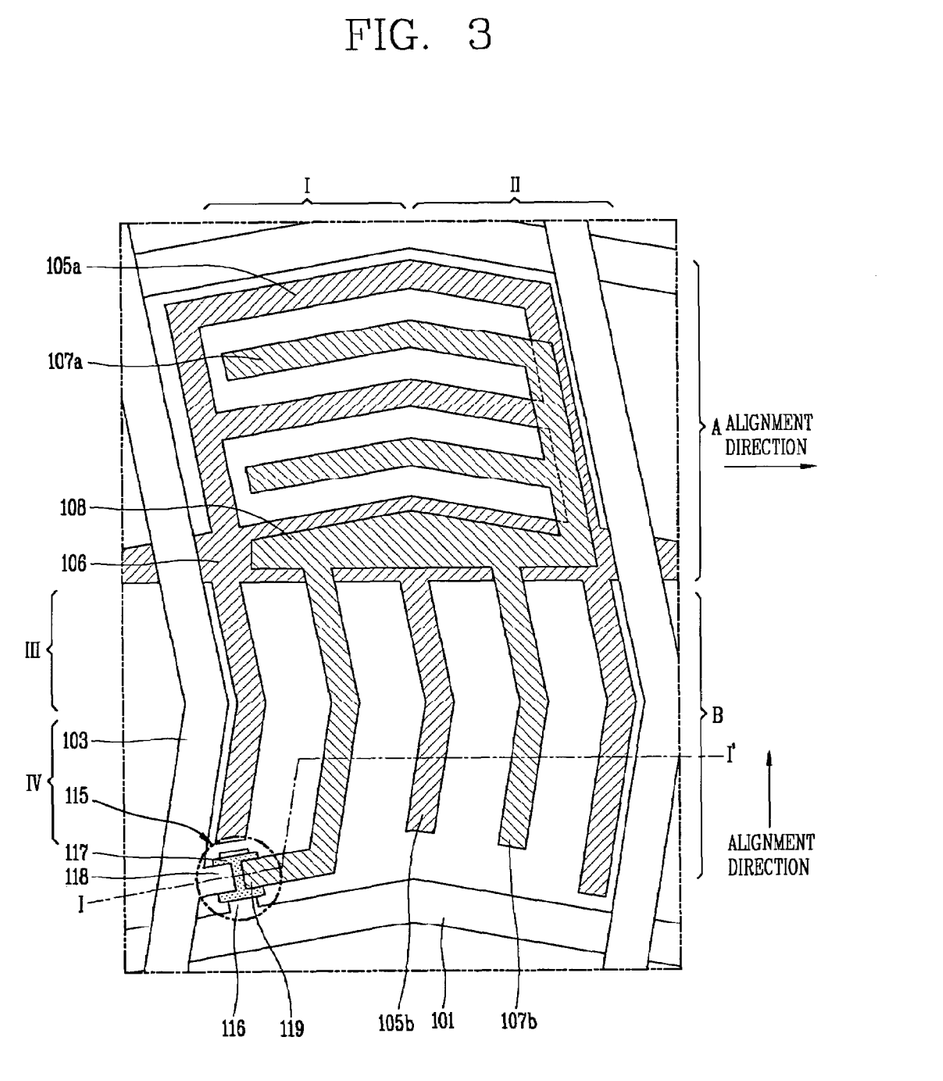
FIG. 3 illustrates the structure of the IPS mode liquid crystal display device in accordance with the first embodiment of the present invention.

FIG. 3 is a plan view illustrating the structure of the IPS mode liquid crystal display device according to the first embodiment of this invention. At this time, only one pixel will be shown in the drawing for convenience of the description.

As shown in FIG. 3, the pixel is defined by the gate line 101 and data line 103, and the thin film transistor is disposed within the pixel. The thin film transistor includes a gate electrode 116 connected to the gate line 101 for applying a scan signal thereto, the semiconductor layer 117 over the gate electrode 116 to be activated by the scan signal to form a channel, and the source and drain electrodes 118,119 over the semiconductor layer 117.

The common electrodes 105a, 105b and the pixel electrodes 107a,107b are disposed in the pixel to form an electric field substantially parallel to the surface of the substrate. The common electrodes 105a, 105b and the pixel electrodes 107a, 107b are respectively connected to the common line 106 and the pixel electrode line 108 which are disposed in the central region of the pixel. The common line 106 and pixel electrode line 108 overlap each other to generate storage capacitance.

The pixel is divided into four-domains. The common electrode 105a and the pixel electrode 107a in the upper region A are arranged along the elongated direction of the gate line 101, while the common electrode 105b and the pixel electrode 107b in the lower region B are arranged along the elongated direction of the data line 103.

Further, the common electrodes 105a,105b and the pixel electrodes 107a,107b in the regions A,B are bent at a predetermined angle. That is, the common electrode 105a and the pixel electrode 107a in the first domain I are arranged at a predetermined angle with the common electrode 105a and the pixel electrode 107a in the second domain II. Further, the common electrode 105b and the pixel electrode 107b in the third domain III are arranged at a predetermined angle with the common electrode 105b and the pixel electrode 107b in the fourth domain IV.

As described above, the common electrodes 105a,105b and the pixel electrodes 107a,107b are bent in a predetermined angle, so that the pixel may be divided into four-domains. The gate line 101 and the data line 103 may be bent at the same angle as the common electrodes 105a,105b and the pixel electrodes 107a,107b.

As shown in FIG. 3, the alignment direction of a alignment layer in the region A is formed in the X-axis direction, and the common electrodes 105a and the pixel electrodes 107a are symmetric in an angle of about 5°-45° centering the X-axis direction. When a signal is applied to form the parallel electric field, the liquid crystal molecules in the first domain I and the second domain II are twisted in opposing directions. As a result, the viewing angle is compensated in the first domain I and the second domain II.

Further, the alignment direction of the alignment layer in the region B is formed in the Y-axis direction, and the common electrodes 105b and the pixel electrodes 107b are symmetric in an angle of about 5-45 degrees centering the Y-axis direction. When a signal is applied to form the parallel electric field, thus, the liquid crystal molecules in the third domain III and the fourth domain IV are twisted in opposing directions. As a result, the viewing angle is compensated in the third domain III and the fourth domain IV.

As described above, the pixel includes four domains I, II, III, IV, and the common electrodes 105a,105b and the pixel electrodes 107a,107b are respectively symmetric in the regions A, B. Further, the alignment direction in the region A is different from that in the region B. Specifically, the alignment direction in the region A is substantially perpendicular to that in the region B.

The alignment direction in the regions A,B may be formed by a rubbing process, an optical aligning process, and an ion aligning process. In order to form the substantially perpendicular alignment direction in the regions A,B, the same alignment material is deposited in the regions A,B and then the regions A,B are separately aligned by the alignment process. Further, it is possible to form the substantially perpendicular alignment direction in the regions A,B by an alignment processing once the regions A,B on which the different alignment material (for example, an alignment material having the alignment direction substantially parallel to the alignment process direction and an alignment material having the alignment direction substantially perpendicular to the alignment process direction).

Figure 4:
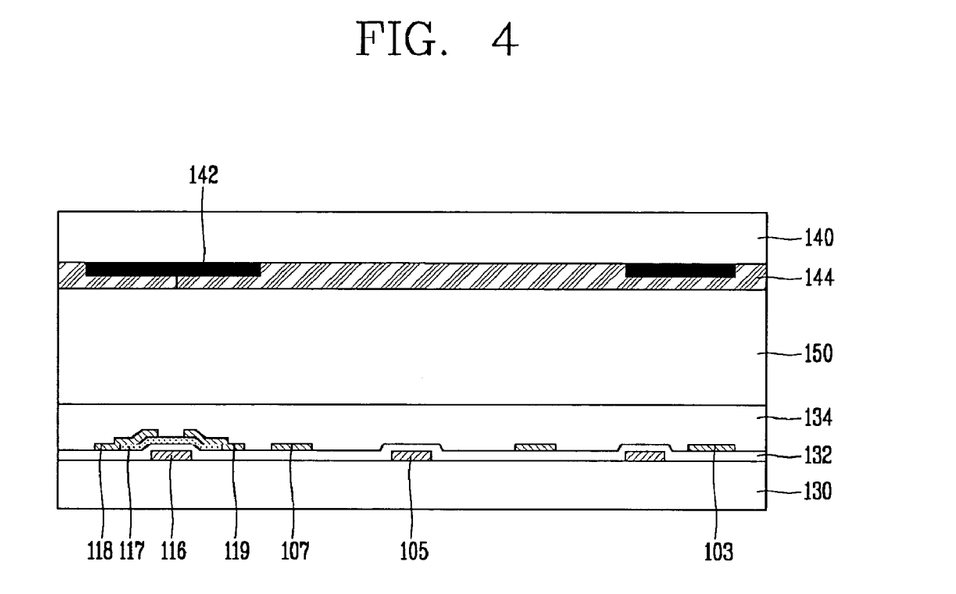
FIG. 4 illustrates a sectional view taken along line I-I' of FIG. 3.
Figure 4B:
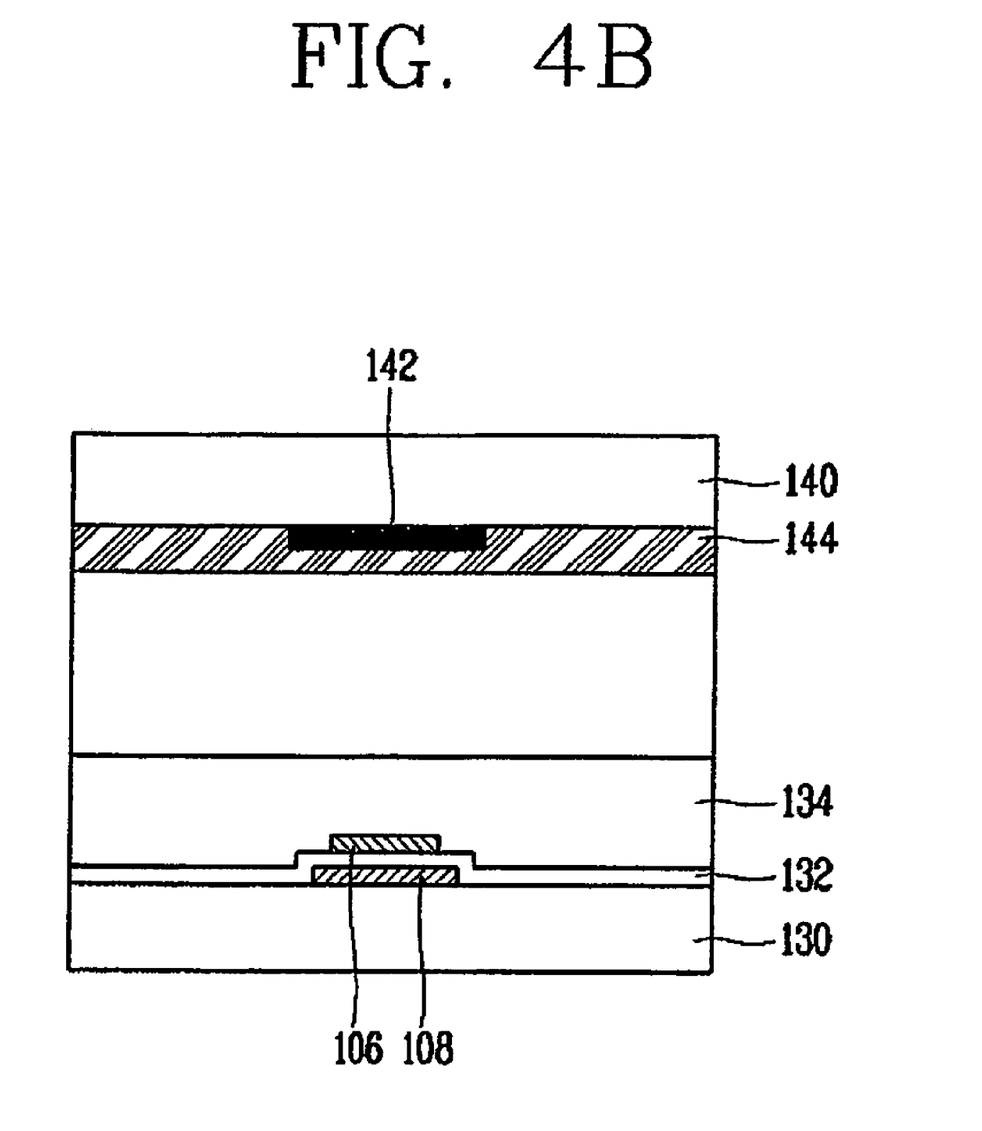

In FIG. 4, the gate electrode 116 and the common electrode 105 are formed on the first substrate 130, and a gate insulating layer 132 is formed over the entire surface of the first substrate 130. The semiconductor layer 117 is formed on the gate insulating layer 132 and the source and drain electrodes 118, 119 are formed on the semiconductor layer 117. Further, pixel electrode 107 is formed substantially parallel to the common electrode 105 on the gate insulating layer.

The common electrodes 105 and the gate electrode 116 may be a single metal layer or multi metal layers formed of a metal such as Cu, Mo, Ta, Cr, Ti, Al, and Al alloy. The metal may be deposited by a sputtering process or evaporation process and then etched using a photolithography process. Further, the pixel electrodes 107 and the source and drain electrodes 118,119 may be a single metal layer or multi metal layers formed of a metal such as Cr, Mo, Ta, Cu, Ti, Al, and Al alloy. The metal may be deposited by a sputtering process or evaporation process and then etched using a photolithography process.

On a second substrate 140 spaced from the first substrate 130, a black matrix 142 and a color filter layer 144 are formed. The black matrix 142 is formed between the pixels and in an area corresponding to the thin film transistor to block the light from passing therethrough. Liquid crystal material is positioned between the first substrate 130 and the second substrate 140 to form the liquid crystal layer.

Although not shown in the figure, the alignment layers are formed over the first substrate 130 and the second substrate 140. Additionally, an overcoat layer may be formed over the second substrate 140 to protect the color filter layer 144 to improve the flatness of the second substrate 140.

Figure 5A:
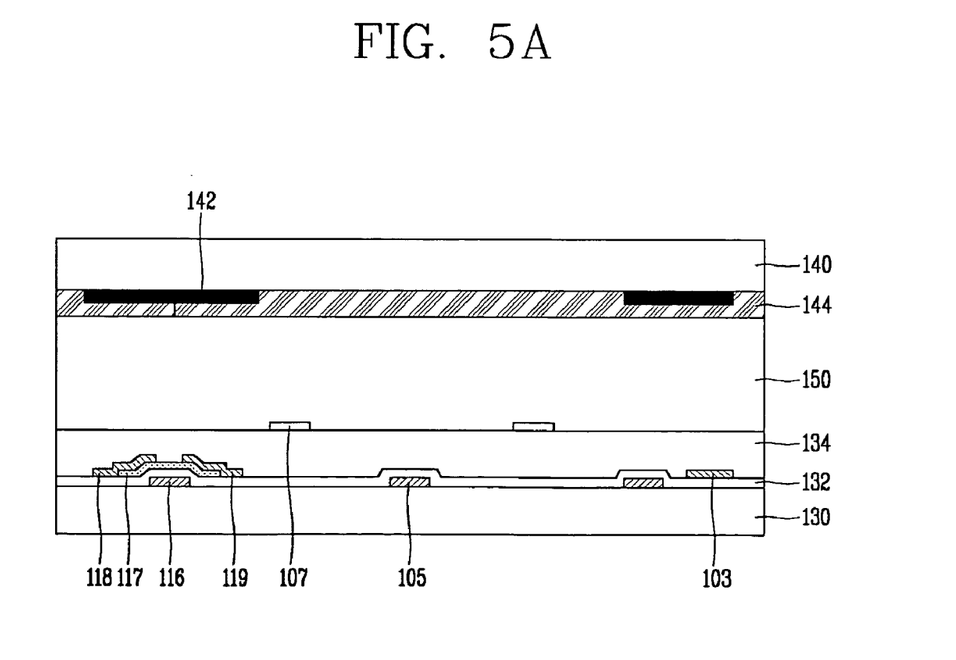
FIGS. 5A-5C are drawings showing another structure of the IPS mode liquid crystal display device in accordance with the present invention.
Figure 5B:
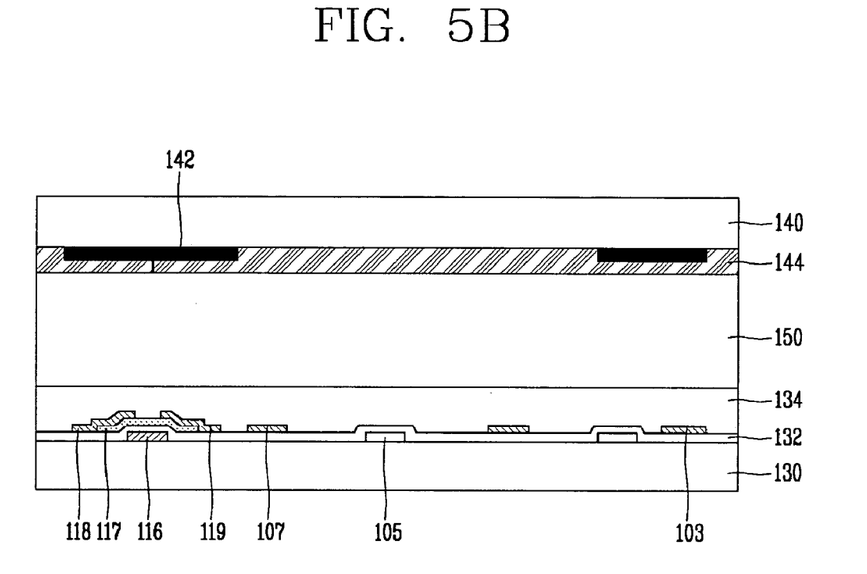
Figure 5C:
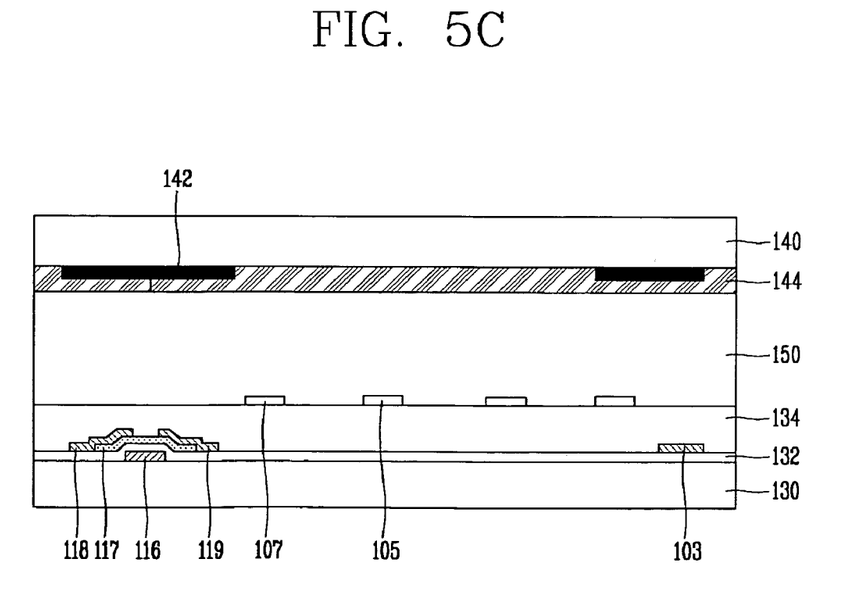

In the structure shown in FIG. 3, the common electrodes 105a,105b and the pixel electrodes 107a, 107b, which may be formed of an opaque metal, are respectively disposed on the first substrate 130 and the gate insulating layer 132. However, this invention may be adapted to the various structures. FIGS. 5A-5C illustrate other examples of this embodiment of the present invention. The plan views of these examples are substantially identical to FIG. 4.

In the IPS mode liquid crystal display device shown in FIG. 5A, the common electrode 105, which may be made of an opaque metal such as Cu, Mo, Ta, Cr, Ti, Al, and Al alloy, is formed on the first substrate 130 and the pixel electrode 107, made of the transparent conductive material such as ITO (Indium Tin Oxide) and IZO (Indium Zinc Oxide), is formed on the passivation layer 134. In this structure, a contact hole must be formed in the passivation layer 134 to connect the drain electrode 119 of the thin film transistor with the pixel electrode 107. Further, the pixel electrode line 108 (shown in FIG. 3) is also formed on the passivation layer 134. A metal layer for storage capacitance not shown in the figure is connected to the pixel electrode 107 through the contact hole (not shown) in the passivation layer 134 and disposed on the gate insulating layer 132 and overlaps the common line 106 (shown in FIG. 3) to obtain a desired amount of storage capacitance.

In the IPS mode liquid crystal display device shown in FIG. 5B, the common electrode 105, made of the transparent conductive material, is formed on the first substrate 130 and the pixel electrode 107, which may be made of the opaque metal, is formed on the gate insulating layer 132. In the IPS mode liquid crystal display device shown in FIG. 5C, the common electrode 105 and the pixel electrode 107, which may be made of the transparent conductive material, are formed on the passivation layer 134.

Because the common electrode 105 and/or the pixel electrode 107 are formed of a transparent conductive material such as ITO and IZO, an aperture ratio and the brightness of the IPS mode liquid crystal display device are improved.

In this embodiment, as described above, the pixel includes four domains and the viewing angle of each domain is compensated by the viewing angle of the neighboring domain, so that the viewing angle characteristic may be improved and the color shift may be prevented.

Figure 6:
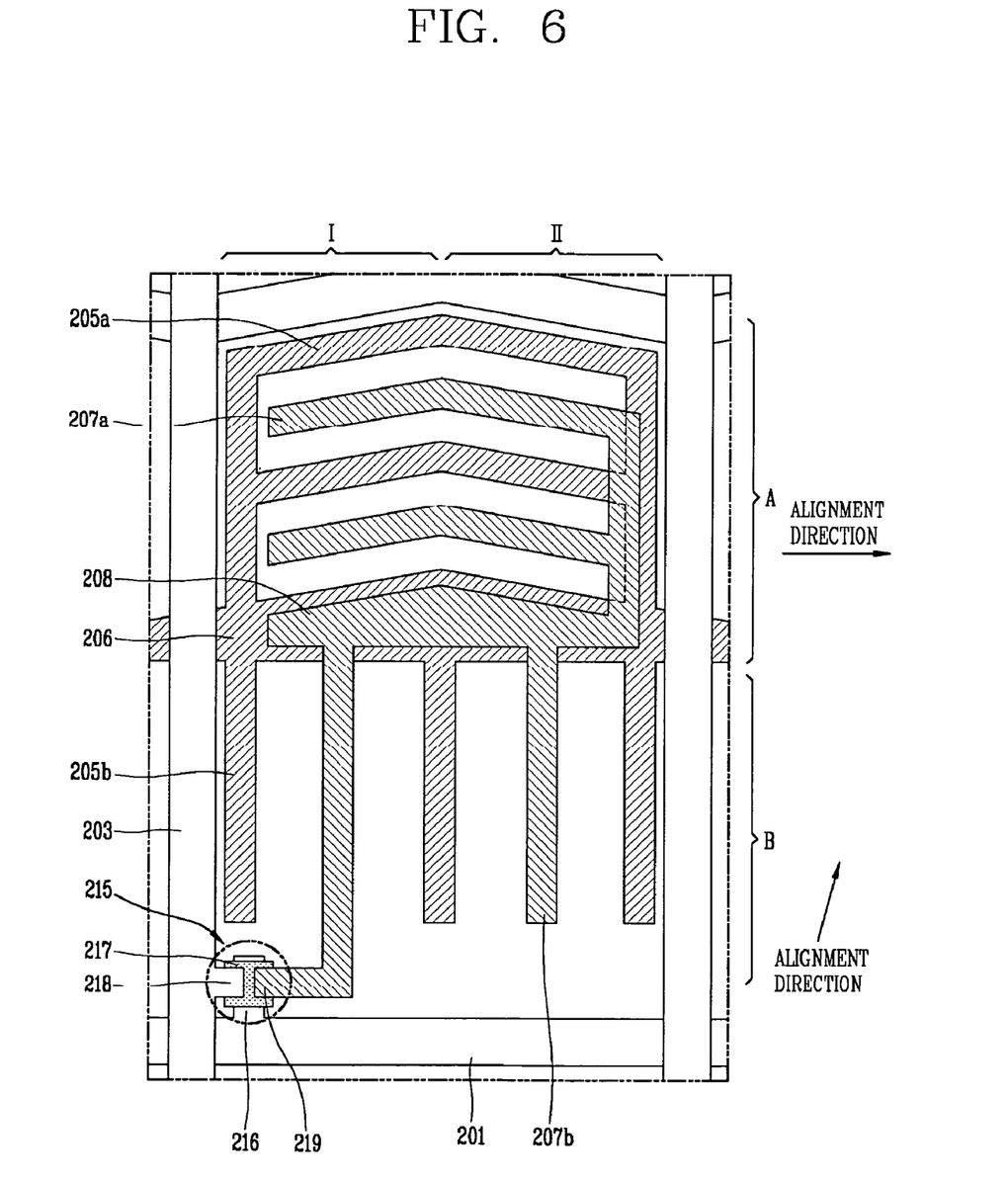
FIG. 6 is a drawing indicating the structure of the IPS mode liquid crystal display device in accordance with the second embodiment of the present invention.

FIG. 6 illustrates the structure of an IPS mode liquid crystal display device according to a second embodiment of the present invention. The IPS mode liquid crystal display device of the second embodiment has a structure similar to the IPS mode liquid crystal display device of the first embodiment. Accordingly, the description for the elements identical to the first embodiment will be omitted.

In the IPS mode liquid crystal display device of the second embodiment shown in FIG. 6, the pixel includes three-domains. Specifically, the pixel is divided into two regions A, B centering the gate line 201 and the upper region A is also divided into two domains. The common electrode 205a and the pixel electrode 207a are bent at a predetermined angle (for example, 4°-45°) in the upper region A. The common electrode 205a and the pixel electrode 207a are symmetric to each other. In the lower region B, the common electrode 205b and the pixel electrode 207b are arranged along the Y-axis direction (that is, arranged substantially parallel to the data line 203).

Because the alignment direction in the upper region A is formed in the X-axis direction, the liquid crystal molecules in the first domain I and the second domain II are twisted in an opposing direction when a signal is applied to the pixel electrode 207a. The alignment direction in the lower region B is formed to have a predetermined angle (for example, 5°-45°) with respect to the Y-axis direction.

In this embodiment, the pixel is divided into three domains, the compensation of the viewing angle is more effective when compared with an IPS mode liquid crystal display device having two domains. Accordingly, the viewing angle characteristic is improved and the color shift is effectively prevented.

The IPS mode liquid crystal display device of this embodiment may include the structures shown in FIGS. 5A-5C. Thus, both the common electrodes 205a,205b and the pixel electrodes 207a,207b may be formed with an opaque metal or transparent conductive material. Further, the common electrodes 205a,205b and the pixel electrodes 207a,207b may be disposed on the first substrate, the gate insulating layer, or the passivation layer.

Figure 7:
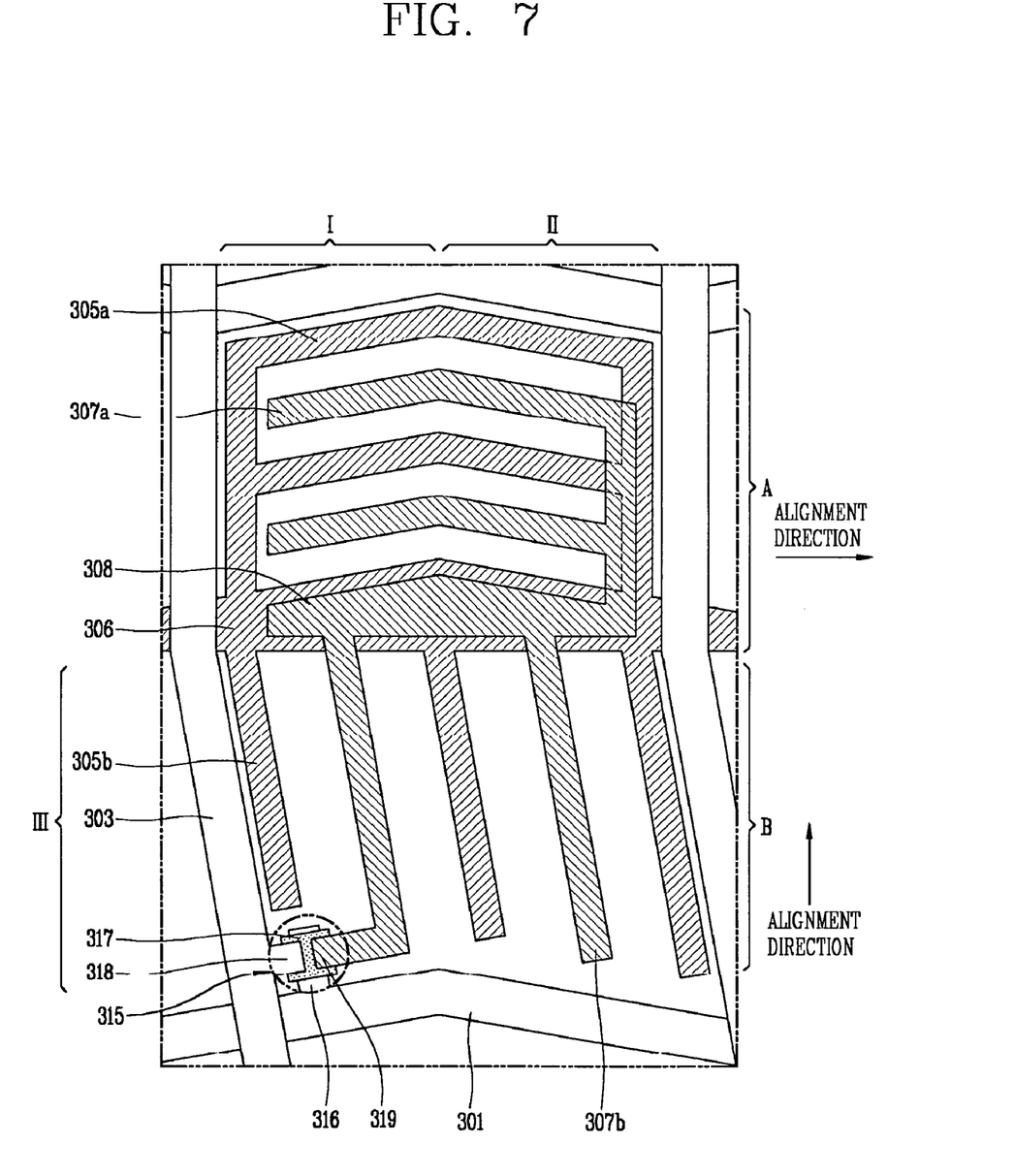
FIG. 7 is a drawing indicating the structure of the IPS mode liquid crystal display device in accordance with the third embodiment of the present invention.

FIG. 7 shows the third embodiment of the present invention. For the convenience, we will only describe the structure different from the IPS mode liquid crystal display device of other embodiments.

The structure in FIG. 7 is similar to that of the second embodiment. The pixel includes three domains, that is, an upper region A having two domains and a lower region B. In the upper region A, the common electrode 305a and the pixel electrode 307a, which are respectively symmetric, are bent at an angle of about 5°-45° with respect to the X-axis direction, and the alignment direction is formed in the X-axis direction. The only difference between the third embodiment and the second embodiment are the elongated direction of the common electrode 305b and the pixel electrode 307b, and the alignment direction in the third domain III (i.e., the lower region B). As shown in FIG. 7, the common electrode 305b and the pixel electrode 307b are bent at an angle of about 5°-45° with respect to the Y-axis direction and the alignment direction is formed in the Y-axis direction.

The present invention is not limited to the aforementioned structure and alignment direction combinations, but may be modified by one of ordinary skill in the art without departing from the scope of the invention. For example, in FIG. 3, the common electrode and the pixel electrode of the upper region A may be disposed in the lower region B (i.e., the common electrode and the pixel electrode in the lower region may be disposed along the gate line), and the common electrode and the pixel electrode of the lower region B may be disposed in the upper region (i.e., the common electrode and the pixel electrode in the upper region may be disposed along the data line). Further, in FIGS. 6 and 7, the common and pixel electrodes in the upper region A may be disposed in the lower region B, and the common and pixel electrodes in the lower region B may be disposed in the upper region A.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device, comprising:
 a plurality of pixels defined by a plurality of gate lines and data lines on a first substrate, each pixel including a first region and a second region;
 a switching member in each pixel; and
 at least one pair of electrodes disposed substantially parallel in each respective region to form a parallel electric field, the electrodes being bent and symmetric to each other in at least one region of the first and second regions, the electrodes in one of the first region and the second region being disposed along the direction of the data lines and the electrodes in the other of the first region and the second region being disposed along the direction of the gate lines.

2. The device according to claim 1, wherein the first region includes:
 a first domain in which the electrodes are disposed at a predetermined angle with respect to an X-axis direction; and
 a second domain in which the electrodes are symmetric with the electrodes in the first domain centering the X-axis direction.

3. The device according to claim 2, wherein the predetermined angle is approximately 5-45 degrees.

4. The device according to claim 3, wherein an alignment direction in the first region is substantially parallel to the X-axis direction.

5. The device according to claim 1, wherein the second region includes:
 a third domain in which the electrodes are disposed at a predetermined angle with respect to a Y-axis direction; and
 a fourth domain in which the electrodes are symmetric with the electrodes in the third domain centering the Y-axis direction.

6. The device according to claim 5, wherein the predetermined angle is approximately 5-45 degrees.

7. The device according to claim 6, wherein an alignment direction in the second region is substantially parallel to the Y-axis direction.

8. The device according to claim 1, wherein the second region includes:
a third domain in which the electrodes are disposed substantially parallel to the Y-axis direction.

9. The device according to claim 8, wherein the alignment direction in the second region is formed in a predetermined angle with respect to the Y-axis direction.

10. The device according to claim 9, wherein the predetermined angle is approximately 5-45 degrees.

11. The device according to claim 1, wherein the second region includes:
 a third domain in which the electrodes are disposed in a predetermined angle with respect to a Y-axis direction.

12. The device according to claim 11, wherein the predetermined angle is approximately 5-45 degrees.

13. The device according to claim 12, wherein an alignment direction in the second region is formed substantially parallel to the Y-axis direction.

14. The device according to claim 1, wherein the electrodes include:
 a common electrode; and
 a pixel electrode disposed substantially parallel to the common electrode.

15. The device according to claim 1, wherein the switching member includes a thin film transistor.

16. The device according to claim 15, wherein the thin film transistor includes:
 a gate electrode on a first substrate;
 a gate insulating layer over the first substrate;
 a semiconductor layer on the gate insulating layer;
 source and drain electrodes on the semiconductor layer; and
 a passivation layer over the first substrate.

17. The device according to claim 16, wherein the common electrode is disposed on the first substrate and the pixel electrode is disposed on the gate insulating layer.

18. The device according to claim 17, wherein the pixel electrode is formed of a metal.

19. The device according to claim 17, wherein the common electrode is formed of a metal.

20. The device according to claim 17, wherein the common electrode is formed of a transparent conductive material.

21. The device according to claim 17, further comprising:
a common line connected to the common electrode and disposed on the first substrate; and
a pixel electrode line connected to the pixel electrode and disposed on the gate insulating layer.

22. The device according to claim 21, wherein at least a portion of the common line and the pixel electrode line overlap and the gate insulating layer is positioned between the overlapped portion of the common line and the pixel electrode line to form a storage capacitance.

23. The device according to claim 16, wherein the common electrode is disposed on the first substrate and the pixel electrode is disposed on the passivation layer.

24. The device according to claim 23, wherein the pixel electrode is formed of the transparent conductive material.

25. The device according to claim 24, further comprising a contact hole in the passivation to connect the pixel electrode and the drain electrode.

26. The device according to claim 23, further comprising:
 a common line connected to the common electrode and disposed on the first substrate; and
 a metal layer on the gate insulating layer, the metal layer being connected to the pixel electrode through a contact hole, the metal layer being overlapped with the common line to form a storage capacitance.

27. The device according to claim 16, wherein the common electrode and the pixel electrode are disposed on the passivation layer.

28. The device according to claim 27, wherein the common electrode and the pixel electrode are formed of a transparent conductive material.

29. The device according to claim 1, further comprising:
 a second substrate having a color filter layer; and
 a liquid crystal layer between the first substrate and the second substrate.

* * * * *